Jan. 28, 1958 V. A. WRIGHT 2,821,165
MOBILE PET HOME
Filed March 6, 1956 2 Sheets-Sheet 1
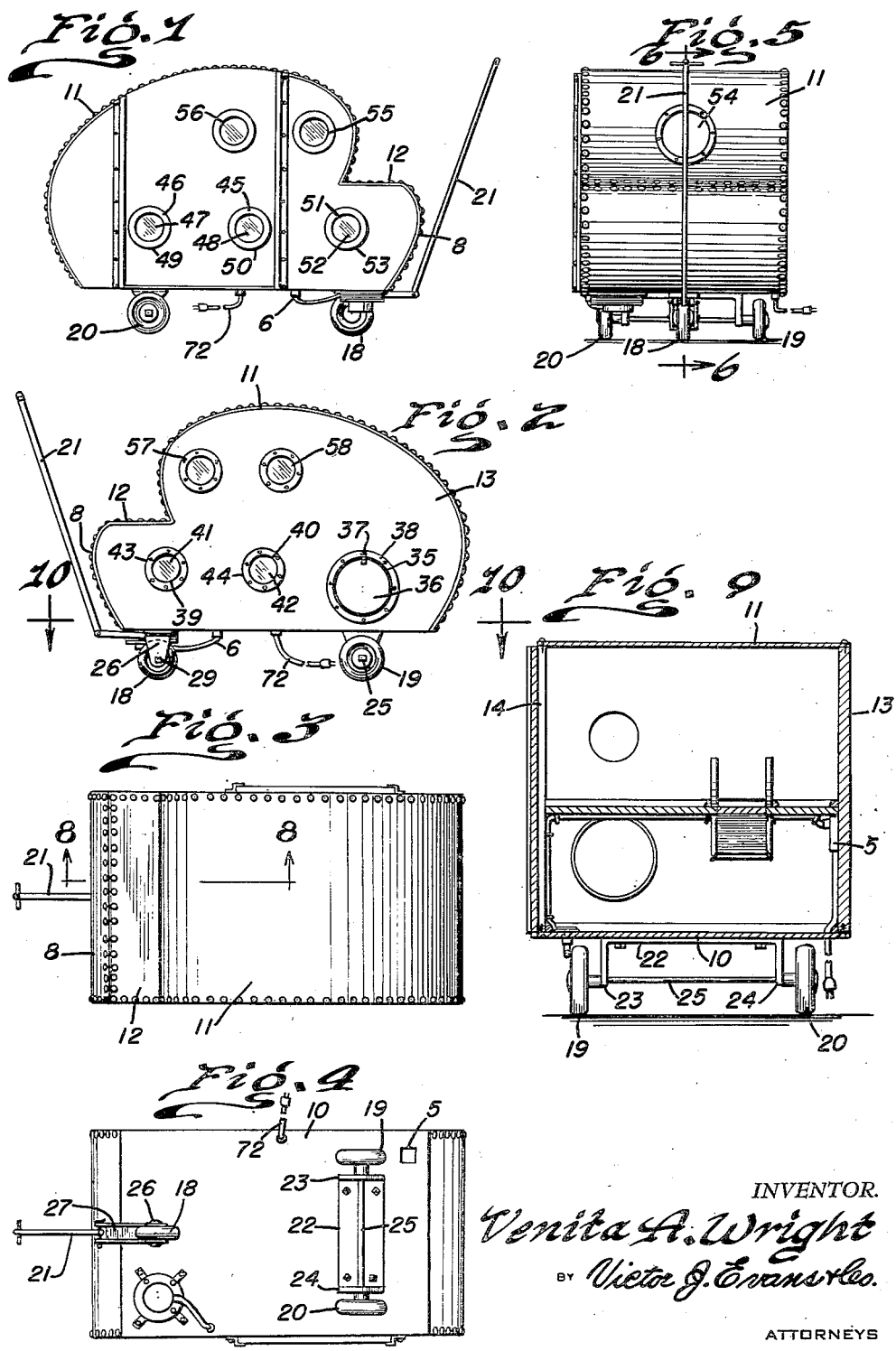
INVENTOR.
Venita A. Wright
BY Victor J. Evans & Co.
ATTORNEYS Jan. 28, 1958     V. A. WRIGHT     2,821,165
MOBILE PET HOME
Filed March 6, 1956     2 Sheets-Sheet 2
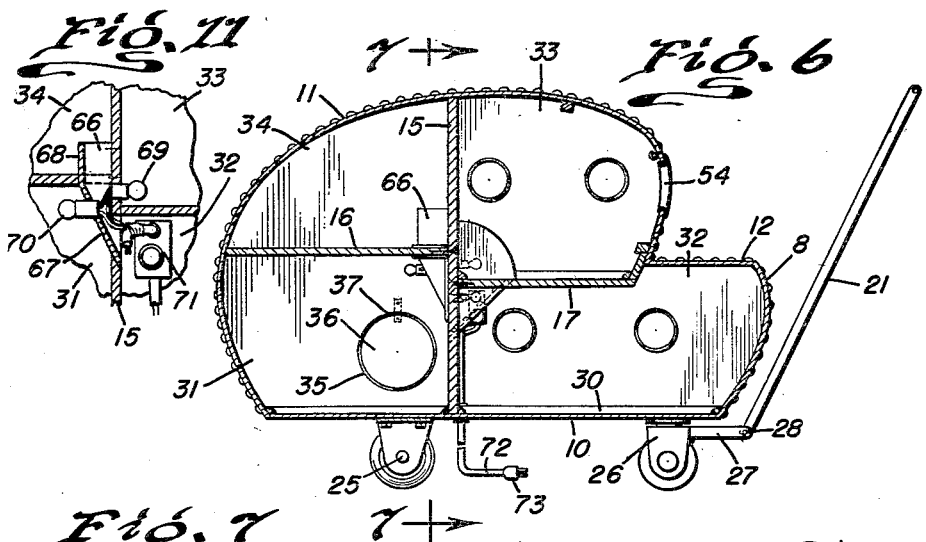
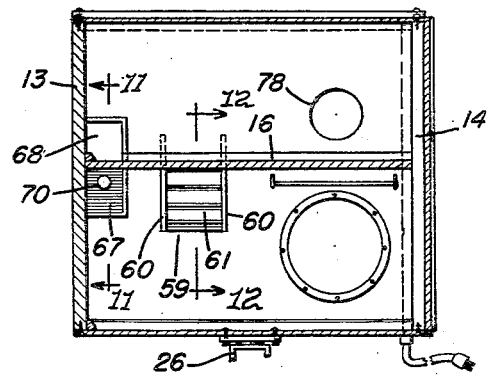
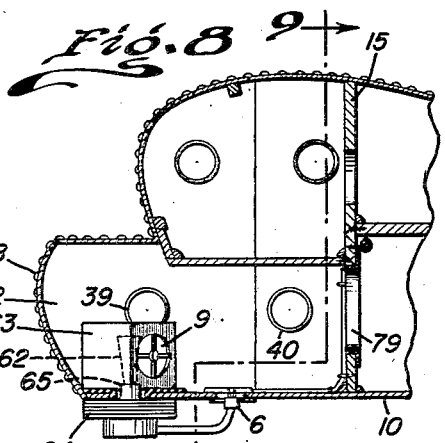
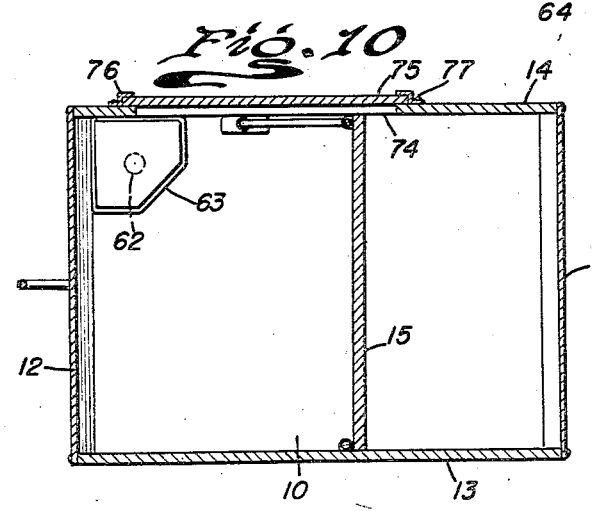
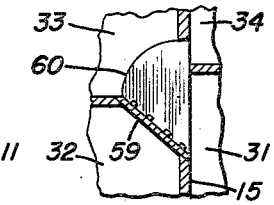
INVENTOR.
Venita A. Wright
BY Victor J. Evans & Co.
ATTORNEYS

United States Patent Office 2,821,165
Patented Jan. 28, 1958

2,821,165
MOBILE PET HOME
Venita A. Wright, Babbitt, Nev.

Application March 6, 1956, Serial No. 569,774

4 Claims. (Cl. 119—15)

This invention relates to outside houses for dogs, cats, and the like, and in particular a combination house having a feeding compartment and a sleeping compartment for a dog on the first or lower floor and a feeding compartment and a sleeping compartment for a cat on an upper or second floor, and the compartments are provided with electric lights and a heater.

The purpose of this invention is to provide a mobile house for pets that is particularly adapted to be moved from one location to another whereby, in moving, a dog or cat may continue living in the same quarters.

Various types of houses have been provided for pets, and particularly birds and the like, however, such houses are permanently installed on posts or on the ground and it is substantially impossible to move a house of this type from one location to another. With this thought in mind this invention contemplates a combination house mounted on wheels and having a tongue whereby the house may be drawn from one location to another and wherein compartments for a dog are provided on a lower level and compartments for a cat on an upper level.

The object of this invention is, therefore, to provide a complete home for cats, dogs, and the like in which the home is adapted to be moved from one location to another.

Another object of the invention is to provide a complete outdoor home for pets in which means is provided for supplying both light and heat in the home.

A further object of the invention is to provide a complete home for cats, dogs, and other pets in which the home may readily be transported from one position to another and in which the home is of a simple and economical construction.

With these and other objects and advantages in view the invention embodies a housing mounted on wheels and having vertical and horizontally disposed partitions with light and heating elements therein, with port holes providing windows in the sides and with a swinging door for a dog in the lower part thereof and an opening to provide entrance for a cat in the upper part.

Other features and advantages of the invention will appear from the following description taken in connection with the drawings, wherein:

Figure 1 is a side elevational view showing the mobile pet house.

Figure 2 is a view looking toward the side of the house opposite to that shown in Fig. 1 and showing a swinging door providing an entrance and exit for a dog in the lower part of the house.

Figure 3 is a plan view of the house.

Figure 4 is a view looking upwardly toward the under surface of the house illustrating the relative positions of the wheel mounting elements thereof.

Figure 5 is a front elevational view of the house showing an opening providing an entrance and exit for a cat in the upper part of the house.

Figure 6 is a longitudinal section through the house taken on line 6—6 of Fig. 5 with the parts shown on an enlarged scale, showing the relative positions of the sleeping and feeding compartments for a cat and also similar compartments for the dog.

Figure 7 is a cross section through the intermediate part of the house taken on line 7—7 of Fig. 6.

Figure 8 is a longitudinal section through the forward part of the house on line 8—8 of Fig. 3, illustrating the mounting of a heater therein, the trailing portion of the house being broken away.

Figure 9 is a cross section through the house taken on line 9—9 of Fig. 8 looking toward the side of the intermediate partition opposite to that shown in Fig. 7.

Figure 10 is a sectional plan through the lower part of the house taken on line 10—10 of Fig. 2.

Figure 11 is a longitudinal section through the house on the line 11—11 of Fig. 7, showing the intermediate part thereof and illustrating the relative positions of lights located at points of intersection of the vertical and horizontal partitions.

Figure 12 is a longitudinal section on the line 12—12 of Fig. 7, also showing the intermediate part of the house with other portions broken away and showing an opening through which a cat may pass from the feeding compartment in the upper part of the house to the feeding compartment in the lower part.

Referring now to the drawings wherein like reference characters denote corresponding parts the improved mobile pet or animal house of this invention includes a flat base 10, an arcuate plate 11 providing a cover for the major portion of the body of the house, a flat end cover or plate 12 providing a closure for the forward end of the house, side walls 13 and 14 connecting edges of the base to edges of the cover and closure, a vertically centrally disposed intermediate wall 15, horizontally disposed intermediate partitions 16 and 17, wheels 18, 19 and 20 and the tongue 21.

The base 10 is provided with a bearing bracket 22 having bearing hangers 23 and 24 depending from ends thereof and a shaft 25 on which the wheels 19 and 20 are positioned is rotatably mounted in lower ends of the hangers. The wheel 18 is rotatably mounted in a caster yoke 26 at the forward end of the base and the yoke is provided with a bar 27 to which the tongue 21 is connected with a pin 28. The wheel 18 is rotatably mounted in the yoke 26 with a pin 29. The lower edges of the side walls 13 and 14, cover 11 and an arcuate shaped end closure 8 are secured to base 10 by suitable fastening means.

With the parts assembled, particularly as illustrated in Fig. 6 the pet home or house is provided with a lower dog feeding compartment 31, a lower sleeping compartment 32, an upper feeding compartment 33 and an upper sleeping compartment 34. The compartment 31 is provided with a door including an opening 35 in the side wall 13 and a disc 36, suspended by a hinge 37 in position in the opening and the opening may also be surrounded with a circular reinforcing ring or flange 38. The plate 13 is also provided with openings 39 and 40 in which transparent discs 41 and 42 are positioned and these openings may also be reinforced with rings 43 and 44, similar to the rings 38. Openings 45 and 46, similar to the openings 39 and 40 are provided in the side plate 14, at the opposite side of the housing and these openings are also provided with transparent discs or panels 47 and 48 and reinforcing rings 49 and 50. An opening 51 having a transparent panel 52 and a ring 53 is also provided in the forward part of the lower compartment 32.

The upper portion of the house is provided with an entrance and exit opening 54 and with openings 55 and 56 in one side and 57 and 58 in the other, the openings 55, 56, 57 and 58 also being provided with transparent panels and reinforcing rings similar to the openings in the lower part of the house.

The intermediate part of the house is provided with a chute or passage 59 having a base with side walls 60. The passage extending from the upper feed compartment or chamber 33 to the lower feed compartment or chamber 31 and providing means for a cat to pass downwardly into the dog compartment. The chute 59 is provided with transversely disposed spaced cleats 61, as illustrated in Fig. 7.

The compartment 32 is also provided with a heating element 62 positioned in a baffle 63 and extending from a heating unit 64 positioned below the base 10 and extended through an opening 65 therein whereby heat is supplied to the compartment 32 and the compartment 32 is provided with a vent 66 extended upwardly into the upper sleeping compartment 34, the vent opening through the intermediate wall 15 and including an inclined baffle 67 and a shield 68 whereby air circulates from the compartment 32 through the vent 66, providing warm air for sleeping compartment 34. The baffle is also provided with a fan 9.

A light 69 is also provided in the compartment 33 and a similar light 70 is provided in the compartment 31. By this means either the cat or dog may be provided with light for eating early in the morning or late in the evening.

The heat in the housing is controlled by a thermostat 71 and the thermostat and lights are supplied with current by an electric cord 72 on the end of which is a plug 73. The cord may extend to a socket 5 and the device is also provided with a fuse box 6.

The side wall or plate 14 is provided with an opening 74 which is covered by a door or panel 75, in which openings 45, 46 and 57 are positioned, and the door is mounted on the wall of the house with a hinge 76 at one side. The door is flush with the wall and the edge opposite to that on which the hinge is positioned is provided with a pull ring 77 and a conventional latch, not shown, may be used if desired. By this means access is provided to the inside of the housing for cleaning.

The wall 15 is also provided with an upper opening 78 and a lower opening 79 to provide passages between the compartments.

With the parts assembled as illustrated and described a portable double deck house for pets and the like is provided with both a feeding and sleeping compartment on both the upper and lower decks and with means for heating, ventilating, and lighting the individual compartments.

The pet home, being mobile, may readily be moved from one location to another and when the owner of a dog or cat moves to a new residence the dog or cat is not bewildered by completely new surroundings.

The housing may be provided in different sizes and may be made of suitable material.

It will be understood that modifications, within the scope of the appended claims, may be made in the design and arrangement of the parts without departing from the spirit of the invention.

What is claimed is:

1. A pet home comprising a housing having a flat base, side walls, an arcuate shaped cover, a flat end cover, and an arcuate shaped end closure, said housing having a centrally disposed vertical wall and horizontally disposed partitions therein extending at right angles in opposite directions from said vertical wall and at different levels and said partitions providing a plurality of compartments and having doors and portholes in said compartments, electric lights positioned in said compartments, and wheels rotatably mounted on said housing.

2. In a pet home, the combination which comprises a housing having a flat base, side walls, an arcuate shaped cover, a flat end cover, and an arcuate shaped end closure, said housing having a centrally disposed vertical wall and horizontally disposed partitions therein extending at right angles in opposite directions from said vertical wall and at different levels and said partitions providing a lower feeding compartment, a lower sleeping compartment, an upper feeding compartment, and an upper sleeping compartment, a door positioned in one of the lower compartments and an entrance and exit opening positioned in one of the said upper compartments, wheels upon which the housing is mounted, and a tongue extended from the mounting of one of said wheels.

3. In a pet home, the combination which comprises a housing having a flat base, side walls, an arcuate shaped cover, a flat end cover, and an arcuate shaped end closure, said housing having a centrally disposed vertical wall and horizontally disposed partitions therein extending at right angles in opposite directions from said vertical wall and at different levels and said partitions providing a lower feeding compartment, a lower sleeping compartment, an upper feeding compartment, and an upper sleeping compartment, a door positioned in one of the lower compartments and an entrance and exit opening positioned in one of the said upper compartments, electric lights and a heater in said housing, wheels upon which the housing is mounted, and a tongue extended from the mounting of one of said wheels.

4. In a pet home, the combination which comprises a housing having a flat base, side walls, an arcuate shaped cover, a flat end cover, and an arcuate shaped end closure, said housing having a centrally disposed vertical wall and horizontally disposed partitions therein extending at right angles in opposite directions from said vertical wall and at different levels and said partitions providing a lower feeding compartment, a lower sleeping compartment, an upper feeding compartment and an upper sleeping compartment, a door positioned in one of the lower compartments and an entrance and exit opening positioned in one of the said upper compartments, said housing having a passage extended between one of the upper compartments and one of the lower compartments, electric lights and a heater in said housing, wheels upon which the housing is mounted, and a tongue extended from the mounting of one of said wheels.

References Cited in the file of this patent

UNITED STATES PATENTS

| | | |
|---|---|---|
| 186,040 | Ketring | Jan. 9, 1877 |
| 1,714,635 | Shafer | May 28, 1929 |
| 2,280,779 | Barragy | Apr. 28, 1942 |
| 2,551,207 | Ensor | May 1, 1951 |
| 2,733,095 | Crivella | Jan. 31, 1956 |

FOREIGN PATENTS

| | | |
|---|---|---|
| 620,764 | Great Britain | Mar. 30, 1949 |